Patented June 12, 1928.

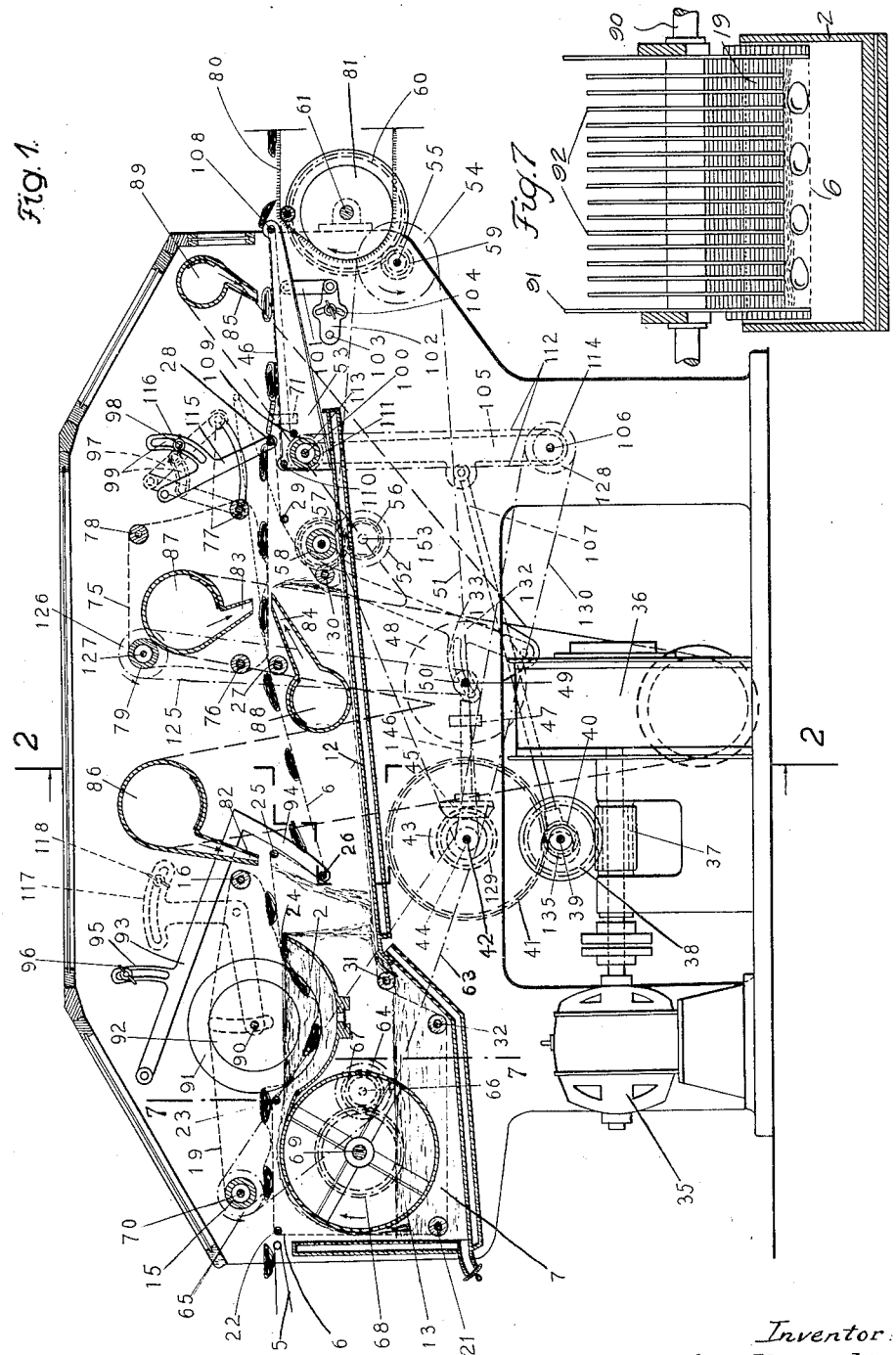

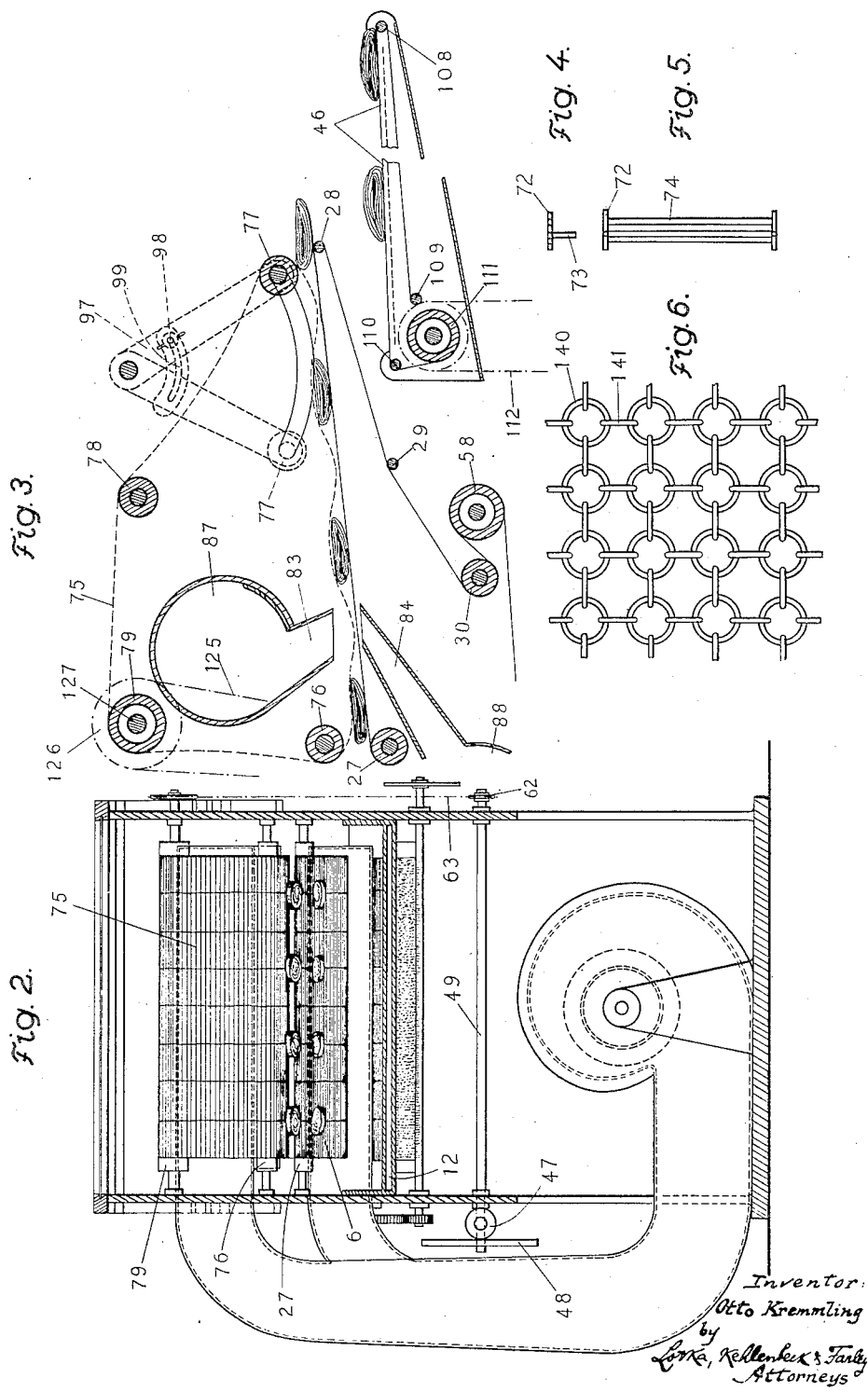

1,673,686

UNITED STATES PATENT OFFICE.

OTTO KREMMLING, OF HAMERSLEBEN KREIS OSCHERSLEBEN, GERMANY.

MACHINE FOR COATING OR INCRUSTING CONFECTIONERY, BISCUITS, AND THE LIKE.

Application filed November 13, 1926, Serial No. 148,165, and in Germany May 5, 1924.

My invention relates to improvements in machines for coating or incrusting confectionery, biscuits, and the like, and more particularly in machines of the type in which the centers to be coated are dipped into the coating matter such as chocolate, sugar, and the like. One of the objects of the improvements is to provide a machine of this type which is effective in operation, and which performs a high class of work. Another object of the improvements is to provide a machine in which centers of different size and form can be coated. With these objects in view my invention consists in providing conveying members for dipping the centers on or into the coating matter, which conveyors are spaced from each other a distance corresponding to the size of the centers, and by means of which the centers are automatically grasped for being dipped into the coating matter. In the preferred form the said conveying means are in the form of rotary disks located above the receptacle containing the coating matter and dipping into the same with their bottom parts, and constructed for passing a conveying band trained thereon into the coating matter, the said conveying band and disks cooperating with a second set of disks of smaller diameter disposed coaxially of and between the first-named disks and having a second conveying band trained thereon by means of which the centers are held in contact with the first-named conveying band. Preferably the upper conveying band by means of which the centers are held downwardly and on the first-named conveying band is trained on its disks so as to have a certain slack. Thereby the band adapts itself to centers of different size, and it holds the same with loose pressure, so that is does not injure even soft centers such as wafers.

For the purpose of explaining the invention an example embodying the same has been shown in the accompanying drawings, in which the same reference characters have been used in all the views to indicate corresponding parts. In said drawings, Fig. 1, is a sectional elevation showing the machine, Fig. 2, is a section taken on the line 2—2 of Fig. 1, Fig. 3, is a detail sectional view on an enlarged scale showing the means for directing an air blast on the surfaces of the coated centers and an oscillating conveying member, Fig. 4, is a detail view showing a part used in connection with the oscillating conveying member shown in Fig. 3, Fig. 5, is a top-plan view of Fig. 4, Fig. 6, is a top-plan view showing the conveying band on an enlarged scale, and Fig. 7 is a cross-section on the line 7—7 of Fig. 1 looking toward the right.

In the example shown in the figures my improved machine consists of a frame composed of two uprights 3 mounted on a suitable foundation, a container 7 for the coating material, an inclined plate 12 adapted to collect the material and to return the same into the container 7, a trough 2 located above the container 7, a rotary wheel 13 dipping into the matter within the container 7 and adapted to deliver the same into the trough 2, a conveying band 6 trained on rollers 21 to 32, a band 19 cooperating with the band 6 for dipping the centers into the matter contained within the trough 2 and trained on rollers 15 and 16, a band 75 trained on rollers 76, 77, 78 and 79, a rockable frame 53 carrying a conveying band 46, a conveying band 80 trained on a roller 81 and other rollers not shown in the figures, and means for directing an air blast on the coated centers at various points of the path thereof, said means being represented in Fig. 1 by nozzles 82, 83, 84 and 85 connected respectively with pipes 86, 87, 88 and 89. Below the parts so far referred to the driving mechanism and a fan or blower are mounted, which will be described hereinafter.

On a shaft 90 disks 91 are mounted, the lower edges of which are immersed in the coating matter contained within the trough 2, and which engage the conveying band 6 at both sides so as to press the same downwardly and into the trough 2. Between the disks 91 disks 92 of smaller diameter are secured to the shaft 90, which support the upper reach of the conveying band 19. As shown the said band extends from the sides of the disks 91 and 92 to both sides, and the lower reach thereof is located above the band 6. Thus the band 19 engages the centers delivered on the band 6 from a conveying band 5 a certain distance away from the disks 91 and 92, so that it securely guides the same downwardly and into the matter contained within the trough 2. In a similar way the dipped centers are conducted by the band 19 to a point away from the disks 91 and 92. As shown in Fig. 1 the lower reach of the band 19 is slack, so that it is pressed against the centers by its weight alone. Thus it adapts itself to centers of different sizes, and its pressure thereon is so light that even brittle or soft centers such as wafers are not injured thereby.

The roller 26 is mounted at both ends on downward extensions 94 of rockers 93 provided with slotted arms 95. By means of wing nuts 96 and screws passed through the slotted arms 96 the rocker 93 and the roller 26 carried thereby can be set in different positions. In the position shown in Fig. 1 the roller 26 has been moved downwardly so far that a loop is produced in the conveying band, so that the centers coming from the trough 2 are turned upside down when falling from the higher portion of the band 6 on the lower portion thereof, as has been indicated by the centers falling on the lower portion. By rocking the rocker 93 upwardly and shifting the roller 26 to the right, as will be described hereinafter, band 6 can be straightened so that the centers are not turned upside down. Further, by setting the rocker 93 in different positions vertically the form of the loop can be changed for adapting the same to centers of different form, and more particularly the difference in the height of the upper and lower portions of the band 6 can be varied.

The lower reach of the band 75 has likewise a certain slack, so that it is capable of loosely engaging the coated centers and holding the same on the conveying band 6. The roller 77 is supported at both ends on rockers 97 pins 98 of which are guided in slots 99. By rocking the rockers 97 to the right the lower reach of the band 75 is lengthened, so that the period of time in which the coated centers are engaged by the band 75 is enlarged.

The frame 53 on which the band 46 is mounted is supported at its left hand end on a shaft 100 carried by a pair of arms 105 rockingly mounted on a shaft 106. Near its right hand end the frame is supported through the intermediary of links 101 on arms 102 mounted on a shaft 103 and adapted to be fixed in different positions vertically by means of a screw and nut 104. The arms 105 are adapted to be oscillated by means of a link 107 operated in the manner to be described hereinafter. The band 46 is trained on rollers 108, 109, 110 and 111, the roller 111 being driven by means of a chain 112 and sprocket wheels 113 and 114, the sprocket wheel 114 being driven in the manner to be described hereinafter. By more or less lifting or lowering the frame 53 by means of the arm 102 the position of the delivery end of the band 46 relatively to the band 80 can be regulated, so that a good transmission of the coated centers from the band 46 to the band 80 is insured. The band 80 is provided with outwardly directed pins or needles on which the coated centers are supported without injuring the coat thereof.

The roller 28 is supported at its ends on levers 115 provided with slotted arms 116 and adapted to be rocked outwardly for elevating the roller 28 into the position shown in Fig. 1 in dotted lines. When thus shifting the roller 28 to the right the lower reach of the band 75 is likewise extended to the right by rocking the rocker 97 to the right, and in this position the band 75 extends so far to the right that it holds the centers being delivered to the band 46 until ⅔ of the length of the centers project freely from the band 6 before being released from the band 6 (see Fig. 3). I have found that thereby the centers are safely reversed when dropping on the band 46.

The shaft 90 is mounted on bell crank levers 116 the upwardly directed arms of which are made integral with slotted segments 117 which are engaged by screws and wing nuts 118 for setting the bell crank levers in different positions and lifting the disks 92 above the surface of the matter contained within the trough 2.

In lugs 71 provided at both sides of the frame 53 a wiping member is mounted, which, as shown in Figs. 4 and 5, consists of a pair of bars 72 formed with pins 73 fitted in bores of the lugs 71, wires 74 being stretched between the bars 72.

At the right of the disks 91 and 92 and the delivery end of the band 19 the nozzle 82 is directed downwardly, through which the blast of air is directed downwardly and on the coated centers moving on the band 6, so as to remove the excess of the material from the top surface thereof. After being reversed the centers pass below the band 75 by means of which they are held in contact with the band 6. Now blasts of air are delivered on the centers through the nozzles 83 and 84, the blast delivered from the nozzle 83 acting on the top face and the blast delivered from the nozzle 84 acting on the bottom face of the center. The coating material which is thus removed from the centers drops on the plate 12 from which it flows downwardly and into the container 7. The nozzle 85 and pipe 89 are disposed above the band 46, and their object is uniformly to distribute the coating material.

For operating the apparatus the following mechanism is provided:

On the base plate of the frame 3 an electric motor 35 is mounted which is connected with a blower 36, which blower is connected with the pipes 86, 87, 88 and 89. On the shaft of the motor there is a worm 37 which is in mesh with a worm gear 38 keyed to a shaft 39. A pinion 40 mounted on the said shaft is in mesh with a gear wheel 41 keyed to a shaft 42. On the shaft 42 a bevel gear wheel 43 and a sprocket wheel 44 are mounted. The bevel gear wheel 43 is in mesh with a bevel gear wheel 45 keyed to a shaft 146. To the said shaft a friction disk 47 is secured, which cooperates with a large friction disk 48 keyed to a shaft 49. On the said shaft a sprocket wheel 50 is mounted. The sprocket wheel 44 is connected by a chain 51 with a sprocket wheel 52 keyed to a shaft 153 and a sprocket wheel 54 keyed to a shaft 55. To the shaft 153 a gear wheel 56 is keyed which is in mesh with a gear wheel 57 connected with a roller 58 in driving engagement with the chain 6. Thus the said chain is driven from the sprocket wheel 44. To the shaft 55 a pinion 59 is keyed, which is in mesh with a gear wheel 60 keyed to a shaft 61. On the said shaft the roller 81 is mounted on which the band 80 is trained. To the shaft 42 a second sprocket wheel 62 is secured which is connected by a chain 63 with a sprocket wheel 64 and a sprocket wheel 65. The sprocket wheel 64 is mounted on a shaft 66 carrying a pinion 67 which is in engagement with a gear wheel 68 keyed to the shaft 69 of the rotary wheel 13. The sprocket wheel 65 is mounted on the shaft 70 of the roller 15. Thus the rotary wheel 13 and the band 19 are driven from the sprocket wheel 62.

The sprocket wheel 50 is connected by a chain 125 with a sprocket wheel 126 keyed to the shaft 127 of the roller 79, so that the band 75 is driven from the sprocket wheel 50 and the friction disks 47 and 48. The friction disk 47 is adapted to be shifted radially of the disk 48 for varying the velocity of the band 75. Thus the band 75 can be moved at the velocity of the band 6, or at a higher velocity. When operating the bands at equal velocities the function of the band 75 is merely to hold the centers on the band 6 while the excess of the coating matter is blown therefrom. But when operating the band 75 at a higher velocity it has the additional function of turning the centers, which of course can be done only in case of round centers. Further, a sprocket wheel 129 is mounted on the shaft 42, which sprocket wheel is connected with a sprocket wheel 128 keyed to the shaft 106 by means of the chain 130. Thus the band 46 is driven from the shaft 42 through the intermediary of the sprocket wheel 129, the chain 130, the sprocket wheels 128, 114, the chain 112 and the sprocket wheel 113.

The roller 30 is mounted on arms 132 adapted to be fixed in different positions by means of a slotted arm 133 and a screw passed through the said slot. As appears more particularly from Fig. 3, the chain 6 trained on the roller 58 is formed with a loop enclosing the roller 30. When rocking the arm 132 to the left the loop is enlarged and the chain 6 is straightened, as is necessary for example when straightening the loop laid around the roller 26

To the shaft 39 a cam 135 is keyed which engages the link 107, and which imparts oscillating movement to the arm 105 and the frame 53.

The operation of the apparatus is as follows: It may be assumed that the parts of the machine are in the positions shown in Fig. 1, and that it is desired to coat flat centers. The centers are supplied to the left hand end of the band 6 by means of the conveying band 5, and they are engaged by the lower reach of the band 19 moving at the same velocity as the band 6. By reason of the slack of the said branch the centers are loosely engaged, so that even soft or brittle centers are not broken. By the bands 19 and 6 the centers are dipped into the coating matter contained within the trough 2, and thereafter they are moved out of the said trough. While leaving the band 19 a blast of air is delivered against the same through the nozzle 82, so that the excess of coating matter is removed therefrom and blown on the plate 12 from which it flows back into the receptacle 7. When passing over the roller 25 the centers falling from the upper portion of the band on the lower one are turned upside down, whereupon they are further moved to the band 75 which likewise loosely engages the same and carries the same between the nozzles 83 and 84. Thereby the coating is further reduced and particularly on the top face thereof. Finally the coated centers are delivered on the band 46 which imparts rapid oscillating movement thereto while gradually feeding the same towards the band 80. When moving from the band 6 on the band 46 the centers are first passed over the wires 74, where the excess of the coating material is removed. While moving on the conveying band 46 a blast of air is delivered on the top faces of the coated centers, which blast is less strong than that delivered through the nozzles 82, 83 and 84, and which has the function merely to smoothen the surface of the coating. The centers carried away by the band 80 are supported only at a few points by the needles of the said band, so that the coating is not injured.

If it is desired to coat the centers at one side only, the shaft 90 and the disks 91 and 92 carried thereby are lifted by rocking the bell crank lever 116 upwardly and fixing the same in elevated position by means of the wing nut 118. Further, the arm 93 is rocked upwardly so that the loop formed thereby is straightened out, and the lever 115 is rocked to the right and into the position shown in dotted lines in which the delivery end of the conveying band 6 is disposed a suitable distance above the band 46. Further, the arm 97 is rocked to the right so as to set the roller 77 and the end of the band 75 into the position shown in Fig. 3. Further, the roller 30 is rocked by means of the arm 132 so far to the left as is necessary for straightening a part of the band 6 and leaving the same slack at the part engaged by the rollers 91.

The centers are again delivered to the band 6 from the band 5 and dipped with their bottom faces into the matter contained within the trough 2. The excess of the coating matter is removed in the same way as has been described before. But it will be noticed that the centers pass below the band 75 with the coated faces directed downwardly. When leaving the band 6 at the right hand end thereof they are held by the band 75 until they project beyond the roller 28 about 2/3 of their lengths, as has been shown in Fig. 3. I have found that when thus allowing the centers to drop on the band 46 they are safely turned upside down, so that thereafter the coated face is directed upwardly. By the oscillating movement of the frame 53 and the blast of air delivered through the nozzle 85 the coated surfaces are smoothened.

In the example so far described it has been assumed that flat centers are to be coated in the machine. However, my invention can also be used for coating round bodies or bodies of other shape such for example as figures representing animals or the like. When coating round bodies the forward and rearward extensions of the band 19 are particularly important because thereby the centers are safely grasped by the band 19 and passed through the trough 2. In case of round bodies I prefer to move the band 75 at a velocity different from that of the band 6, so that the bodies are rolled while passsing between the nozzles 83 and 84, and the excess of coating matter is removed from the whole surface.

In case of centers provided with projecting parts which might be broken by the reversing operation, the rollers 26 or 77 are set at such distances away from the roller 25 and the band 46 that the centers are not broken by falling.

In Fig. 6 I have shown the preferred form of the bands used in my improved machine. As shown the said bands are composed of rings 140 connected by links 141.

From the foregoing description of my improved machine it will be understood that centers of different forms may be provided with a uniform and thin coat, and that the machine may be adapted to centers of different sizes. By providing slack bands 19 and 75, even brittle or soft centers can be coated without being broken. When coating round centers the fins heretofore produced at the bottom of the centers are avoided. An important feature of the invention resides in providing the forward and rearward extensions of the band 19 by means of which the centers are securely held before and after passing the same through the trough 2.

The extent of the oscillating movement of the band 46 can be varied by connecting the link 107 to different points of the arm 105. I have found that light centers require a higher oscillating velocity of the band 46 than heavy centers.

While in describing the invention reference has been made to a particular example embodying the same, I wish it to be understood that my invention is not limited to the construction shown in the drawing, and that various changes may be made in the general arrangement of the apparatus and the construction of its parts without departing from the invention. For example, in lieu of the band 19 the disks 92 may be used for dipping the centers into the trough 2.

I claim:

1. A machine for coating centers of confectionery, biscuits, and the like, comprising coating means, a conveyer band for conveying the coated centers away from said coating means, an endless band having a slack reach located above said conveyer band, means for delivering an air blast against the centers passing between the conveyer band and said slack reach, and means for moving said endless band at a velocity different from that of the conveyer band.

2. A machine for coating centers of confectionery, biscuits, and the like, comprising coating means, a conveyer band for moving the coated centers away from said coating means, a second conveyer band located at the delivery end of said first-named conveyer band, means to displace said conveyer bands at their adjacent ends relatively to each other in vertical direction, an endless band located above said first-named conveyer band near the delivery end thereof and having a slack lower reach, and means to extend said lower reach towards the delivery end of said first-named conveyer band.

3. A machine for coating edible articles, comprising a receptacle for the coating material, a conveyor having a portion extending into said receptacle and adapted to carry the articles into and out of the coating material, and a flexible band loosely overlying said portion, said band being slack and resting by gravity alone throughout the portion engaging said articles to enable it to conform to the shape of the articles and hold them on said portion by its weight.

4. A machine for coating edible articles, comprising a receptacle for liquid coating material, a conveyor having a portion extending into said receptacle and adapted to carry said articles into and out of the coating material, a flexible band loosely overlying said portion, said band being provided with sufficient slack to enable it to conform to the shape of the articles and hold them on said portion by its weight, and an inclined plate arranged below said conveyor to return excess coating material to said receptacle.

5. A machine for coating edible articles, comprising a receptacle for liquid coating material, a conveyor having a portion extending into said receptacle and adapted to carry said articles into and out of the coating material, disks engaging said portion to hold it in operative position, and a flexible band overlying said portion and provided with sufficient slack to enable it to conform to the shape of the articles and hold them on said portion by its own weight.

6. A machine for coating edible articles, comprising a receptacle for liquid coating material, a conveyor having a portion extending into said receptacle and adapted to carry said articles into and out of the coating material, adjustable means for holding said portion in operative position, and a flexible band overlying said portion and provided with sufficient slack to enable it to conform to the shape of the articles and hold them on said portion, said conveyor being arranged intermediate its ends to overturn said articles.

7. A machine for coating edible articles, comprising a receptacle for coating material, a conveyor having a portion extending into said receptacle and adapted to carry said articles into and out of the coating material, and a flexible band overlying said portion and provided with sufficient slack to enable it to conform to the shape of the articles and hold them on said portion, said conveyor being doubled transversely at two places intermediate its ends to adapt it to overturn said articles.

8. A machine for coating edible articles, comprising a receptacle for coating material, a conveyor having a portion extending into said receptacle and adapted to carry said articles into and out of the coating material, a flexible band loosely overlying said portion and adapted to retain said articles on said portion, said conveyor being doubled transversely at two places intermediate its ends to adapt it to overturn said articles, and a blower for removing excess coating material positioned between said receptacle and the place where the articles are overturned.

9. A machine for coating edible articles, comprising a receptacle for coating material, a conveyor having a portion extending into said receptacle and adapted to carry said articles into and out of the coating material, a flexible band loosely overlying said portion and resting by gravity alone throughout the portion engaging said articles whereby the latter are retained on said portion, means for rolling the articles after they have been carried out of said material, and a second conveyor for receiving the articles from said rolling means, the operative surface of said second conveyor being formed of a plurality of fine points.

10. A machine for coating edible articles, comprising a receptacle for coating material, a conveyor having a portion extending into said receptacle and adapted to carry said articles into and out of the coating material, said conveyor being doubled transversely at two places intermediate its ends to adapt it to overturn said articles, and means for straightening the doubled portions of said conveyor to eliminate the overturning operation.

In testimony whereof I have signed at the city of Berlin this 22nd day of October A. D. 1926.

OTTO KREMMLING.